United States Patent [19]

Zaki et al.

[11] Patent Number: 5,492,880
[45] Date of Patent: Feb. 20, 1996

[54] PROCESS FOR THE INORGANIC CHEMICAL MODIFICATION OF RHODIUM ALUMINA CATALYSTS AND AUTOMOTIVE CATALYST MADE BY THE PROCESS

[75] Inventors: Mohamed I. Zaki, El-Minia, Egypt; Todd H. Ballinger, Pittsburgh; John T. Yates, Jr., Allison Park, both of Pa.

[73] Assignee: University of Pittsburgh of the Commonwealth System of Higher Education, Pittsburgh, Pa.

[21] Appl. No.: 259,737

[22] Filed: Jun. 1, 1994

Related U.S. Application Data

[63] Continuation of Ser. No. 82,143, Jun. 24, 1993, abandoned, which is a continuation of Ser. No. 964,575, Oct. 21, 1992, abandoned, which is a continuation of Ser. No. 690,830, Jun. 24, 1991, abandoned.

[51] Int. Cl.$^6$ .................. B01J 37/14; B01J 37/08; B01J 23/58; B01J 21/04
[52] U.S. Cl. ................ 502/330; 502/328; 423/213.5
[58] Field of Search .................. 502/328, 330; 423/213.5

[56] References Cited

U.S. PATENT DOCUMENTS

| | | | |
|---|---|---|---|
| 3,271,325 | 9/1966 | Davies et al. | 252/466 |
| 3,409,390 | 11/1968 | Hoekstra | 502/328 X |
| 3,629,153 | 12/1971 | Pryor | 252/463 |
| 3,696,167 | 10/1972 | Juguin et al. | 502/330 |
| 3,752,775 | 8/1973 | Yamaguchi et al. | 252/464 |
| 3,948,809 | 4/1976 | Norman et al. | 252/463 |
| 3,972,952 | 8/1976 | Clark | 502/328 |
| 4,083,919 | 4/1978 | Pearlman | 264/332 |
| 4,207,169 | 6/1980 | Courty et al. | 208/124 |
| 4,369,132 | 1/1983 | Kinoshita et al. | 502/333 X |
| 4,755,499 | 7/1988 | Neal et al. | 502/415 |
| 4,977,129 | 12/1990 | Ernest | 423/213.5 X |

Primary Examiner—Douglas J. McGinty
Attorney, Agent, or Firm—Eckert Seamans Cherin & Mellott; Jolene W. Appleman; Arnold B. Silverman

[57] ABSTRACT

A process for chemically converting surface hydroxyl groups present on an aluminum oxide supported rhodium catalyst that is suitable for use as an automotive catalyst in controlling automotive exhaust emissions is disclosed. The process includes converting the hydroxyl groups on the aluminum oxide supported catalyst by reacting the aluminum oxide support with an alumina modifier which comprises an inorganic compound containing the cation Y, wherein Y is either an alkali metal or an alkaline earth metal. This process involves replacing the hydroxyl groups on the aluminum oxide support with OY groups to resist the oxidative conversion of supported metallic rhodium $Rh_x^{(O)}$ to $Rh^{(I)}$. An associated catalyst suitable for use in automotive catalytic converter technology for environmental protection is provided.

14 Claims, 3 Drawing Sheets

5,492,880

PROCESS FOR THE INORGANIC CHEMICAL MODIFICATION OF RHODIUM ALUMINA CATALYSTS AND AUTOMOTIVE CATALYST MADE BY THE PROCESS

This is a continuation of application Ser. No. 08/082,143, filed Jun. 24, 1993, now abandoned, which is a continuation of application Ser. No. 07/964,575 filed Oct. 21, 1992, now abandoned, which is a continuation of application Ser. No. 07/690,830 filed Jun. 24, 1991, now abandoned.

BACKGROUND OF THE INVENTION

1. Field of the Invention

This invention relates to the inorganic surface modification of an aluminum oxide supported rhodium catalyst that forms the basis for an improved automotive catalytic converter useful in environmental protection.

2. Brief Description of the Prior Art

Automotive catalysts for controlling automotive exhaust emissions are comprised of the noble metals platinum (Pt), palladium (Pd), and rhodium (Rh). Of these metals, rhodium is the most effective for reducing the oxides of nitrogen to nitrogen gas. Generally in the automotive catalyst field, rhodium is highly dispersed on aluminum oxide ($Al_2O_3$) supports and is active as a metal particle designated $Rh_x^{(O)}$ where the subscript "x" refers to the number of Rh atoms in a Rh crystallite or assembly and the superscript "(O)" refers to the oxidation state number. It is known that active $Rh_x^{(O)}$ may be converted to an oxidized species $Rh^{(I)}$ by an oxidation process in which surface hydroxyl groups present on the oxide support are consumed in the presence of carbon monoxide (CO) gas. Both the carbon monoxide gas and the surface hydroxyl groups simultaneously participate in the destruction of the $Rh_x^{(O)}$. This process can be reversed using hydrogen gas ($H_2$) which reduces the $Rh^{(I)}$ surface species, present as $Rh^{(I)}(CO)_2$ species, to $Rh_x^{(O)}$ while regenerating the isolated hydroxyl groups. *J. Am. Chem. Soc.*, Vol. 110, p. 2074 (1988).

U.S. Pat. No. 3,271,325 discloses a composition for an alumina containing material for use in catalysts having a hydrate of alumina, aluminum, and a compound of a metal selected from aluminum and metals of Groups I, II, III and VIII, of the Periodic Table. This patent discloses that the metal may be, among other things, platinum group metal hydroxides and carbonates. It discloses that a steam reforming catalyst composition may be prepared in a variety of ways and that the platinum group metal constituents of the catalyst, such as for example rhodium, may be incorporated at various stages in its preparation. It also states that it is useful to have present in a catalyst composition an alkali metal compound such as potassium carbonate to reduce the formation of carbon in a steam reforming process.

U.S. Pat. No. 3,629,153 discloses a process for preparing an alkalized alumina solid adsorbent by first reacting an alkali metal aluminate with either ammonium carbonate or carbon dioxide to form dawsonite and then heating the dawsonite to convert it to alkalized alumina comprising substantially $Al_2O_3$ and an alkali metal.

U.S. Pat. No. 3,752,775 discloses an oxidation catalyst for catalyzing oxidation reactions in hydrocarbon-oxygen containing mixtures having an alkali metal polyaluminate wherein the alkali metal may be potassium. It discloses a process for producing an oxidation catalyst having an alkali polyaluminate. It also states that this catalyst is especially suitable for reactions which are liable to cause problems by formation of free carbon, such as in the conversion of a high calorific oil gas containing relatively large amounts of unsaturated hydrocarbons and in the cleaning of exhaust gas from automobiles containing a large amount of un-ignited fuel.

U.S. Pat. No. 3,948,809 discloses a process for producing an absorbent by leaching a material containing aluminum oxide with an alkaline solution, separating the resultant leach liquor from the undissolved material, adding an alkali metal carbonate to the separated leach liquor, drying the liquor to produce the absorbent in solid form and calcining the absorbent.

U.S. Pat. No. 4,083,919 discloses a hot-pressed beta-alumina composition prepared by mixing and reacting a solution of aluminum alcoholate and an aqueous solution of an alkali metal salt to form a gelatinous precipitate, drying the gelatinous precipitate, grinding the dried gelatinous precipitate into a fine powder and hot-pressing the fine powder. This patent states that the alkali metal salt may be potassium carbonate.

U.S. Pat. No. 4,207,169 discloses a process for steam dealkylation of alkylaromatic hydrocarbons employing a catalyst containing an alumina carrier, rhodium, titanium oxide, and an alkali metal that may be in the form of potassium carbonate. This patent states that the addition of titanium oxide to the alumina carrier has the effect of reducing the deactivation rate of the catalyst.

U.S. Pat. No. 4,755,499 discloses a sorbent for the removal of gaseous nitrogen oxides, sulfur oxides, and hydrogen sulfide from waste gas streams. The sorbent is a gamma alumina substrate impregnated with an alkali metal component wherein the alkali metal component may be potassium.

In spite of these prior art disclosures, there remains a very real and substantial need for a process for the chemical modification of an aluminum oxide supported rhodium catalyst to prevent conversion of $Rh_x^{(O)}$ to $Rh^{(I)}$ surface species. Such a process may be employed to create an automotive catalyst converter which is beneficial for environmental protection, as well as stable $Rh_x^{(O)}$ catalysts used for other chemical processes such as for example benzene reduction to cyclohexane and organic nitrile reduction to organic amines. More specifically, there is a need for such a chemical modification of alumina using an inorganic cation, Y, wherein Y may be either an alkali metal or an alkaline earth metal. Here surface hydroxyl groups on the aluminum oxide support are converted to Al—OY groups. This prevents the conversion of active rhodium $Rh_x^{(O)}$ species to inactive rhodium species, $Rh^{(I)}$, by removal of the hydroxyl groups which otherwise would participate in $Rh_x^{(O)} \rightarrow Rh^{(I)}$ conversion.

SUMMARY OF THE INVENTION

The present invention has met the abovedescribed need. The process of the present invention provides an efficient and economical inorganic chemical modification of aluminum oxide supported rhodium catalysts for enhancing performance when used to control automotive exhaust emissions, and other catalytic processes requiring $Rh_x^{(O)}$ surface species.

The chemical process of this invention includes replacing isolated hydroxyl groups (—OH) on the aluminum oxide supported rhodium catalysts, $Rh/Al_2O_3$, with OY groups by reacting the aluminum oxide support with an alumina modifier which comprises an inorganic compound containing cation Y, wherein Y may be either an alkali metal or an alkaline earth metal. By converting surface hydroxyl groups on the aluminum oxide support to OY groups through the use of the alumina modifier, the undesired oxidative conversion of supported metallic rhodium $Rh_x^{(O)}$ to oxidized rhodium species $Rh^{(I)}$ is resisted or substantially prevented.

The chemical process preferably employs potassium carbonate as the alumina modifier. However, other salts of the alkali metals and the alkaline earth metals may be used such as for example sodium carbonate, sodium bicarbonate, calcium carbonate and calcium bicarbonate.

The product that results from the chemical modification of an aluminum oxide supported rhodium catalyst may be a catalyst suitable for use in controlling automotive exhaust emissions. The catalyst includes an aluminum oxide supported rhodium catalyst having nonoxidized rhodium sites, and surface hydroxyl groups converted to OY groups with an alumina modifier. The catalyst of this invention is characterized by the property of resisting the conversion of non-oxidized rhodium metallic sites $Rh_x^{(O)}$ to oxidized rhodium sites $Rh^{(I)}$.

It is an object of the present invention to provide a chemical process for converting the hydroxyl groups from an aluminum oxide supported rhodium catalyst to OY groups by a specific chemical reaction with an alumina modifier. This process substantially prevents the conversion of active rhodium $Rh_x^{(O)}$ to oxidized rhodium species $Rh^{(I)}$.

It is another object of the present invention to preserve catalytically active metals, following chemical modification of the aluminum oxide support.

It is another object of this invention to use alumina modifiers to specifically functionalize isolated aluminum-hydroxyl species on the aluminum oxide support containing clean active rhodium sites, $Rh_x^{(O)}$, while producing aluminum-OY surface species adjacent to $Rh_x^{(O)}$ metal particles.

It is another object of the present invention to provide a chemical process that preserves the active rhodium sites $Rh_x^{(O)}$ in catalytic environments found in automotive converters for environmental protection.

It is another object of the present invention to employ potassium carbonate as the alumina modifier.

It is another object of this invention to provide a catalyst that will substantially withstand hydrolysis by steam without subsequent formation of $Rh^{(I)}(CO)_2$ in the presence of carbon monoxide gas (CO).

It is another object of the present invention to enhance the performance of an aluminum oxide supported rhodium catalyst used in controlling automotive exhaust emissions.

It is yet another object of this invention to provide a chemical process and an automotive catalyst that are economical and compatible with existing automotive catalytic exhaust emission technology for environmental protection.

These and other objects of the invention will be more fully understood from the following descriptions of the invention, the drawings and the claims appended hereto.

DESCRIPTION OF THE PREFERRED EMBODIMENTS

The product and chemical process of this invention provide for the modification of aluminum oxide supported rhodium catalysts that are used in the automotive industry to control exhaust emissions. As employed herein "automotive" includes automobiles and light duty trucks. Light duty trucks include trucks having a gross vehicle weight less than or equal to about 8,500 pounds.

The chemical process of this invention includes converting hydroxyl groups on an aluminum oxide supported rhodium catalyst, $Rh/Al_2O_3$, to OY groups by reacting the aluminum oxide support with an alumina modifier. The alumina modifier includes an inorganic compound containing the cation Y, wherein Y is either an alkali metal or an alkaline earth metal. The alumina modifier employed in this conversion reaction preferably is potassium carbonate $(K_2CO_3)$.

By converting the hydroxyl groups on the surface of the aluminum oxide supported rhodium catalysts by using an alumina modifier, the oxidative conversion of supported and metallic rhodium $Rh_x^{(O)}$ to oxidized rhodium $Rh^{(I)}$ is resisted or substantially prevented. This oxidative degradation process is shown schematically in FIG. 1.

Figure 1:
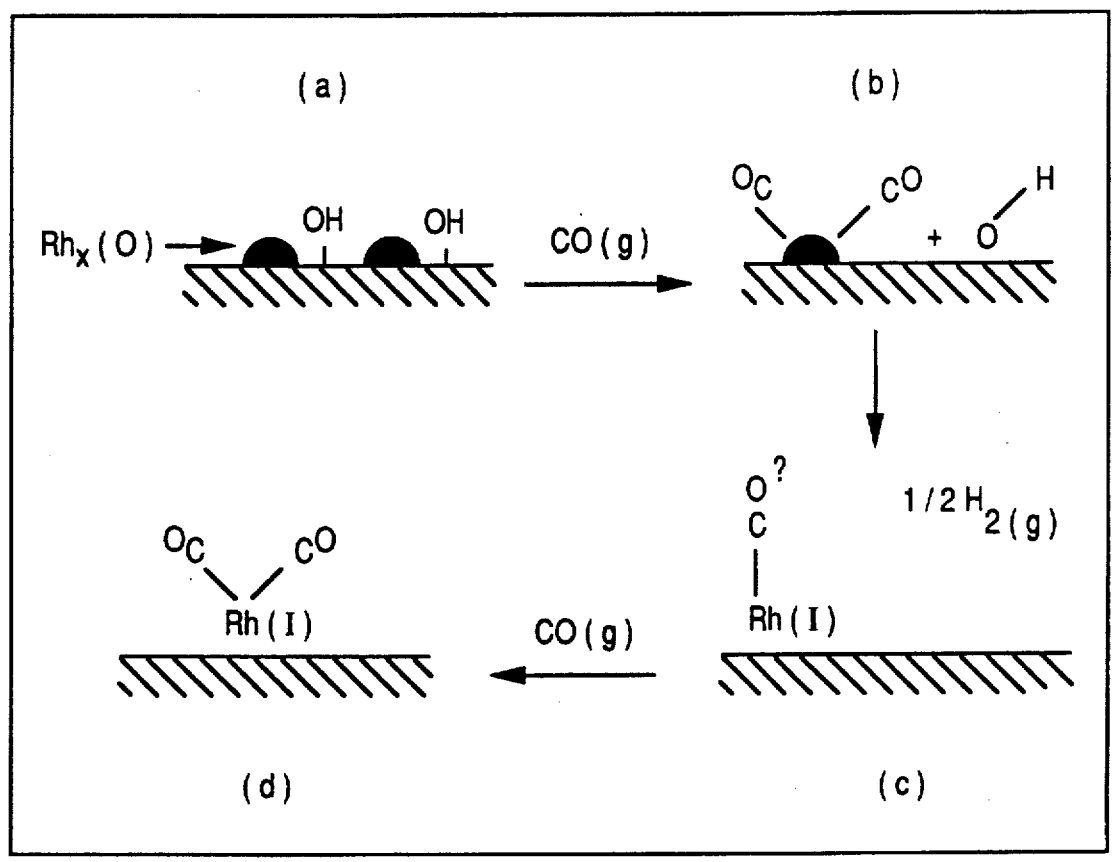
FIG. 1 shows a schematic diagram of the oxidative degradation of metallic Rh particles by isolated —OH groups.

FIG. 1 illustrates the oxidation of $Rh_x^{(O)}$ leading to the formation of $Rh^{(I)}(CO)_2$ species. In FIG. 1(a), surface hydroxyl groups are shown on an aluminum oxide supported rhodium catalyst. This catalyst is exposed to carbon monoxide gas with a formation of the respective intermediates as shown in FIGS. 1(b) and 1(c). Additional exposure to carbon monoxide gas results in the formation of $Rh^{(I)}(CO)_2$ species as shown in FIG. 1(d). It will be appreciated from FIG. 1(d) that $Rh^{(I)}(CO)_2$ species are produced as final products from the consumption of isolated-OH groups on the catalyst support in the presence of CO gas.

The process of this invention prepares protected $Rh_x^{(O)}$ catalysts by functionalizing the isolated Al—OH groups with an alumina modifier that introduces an inorganic cation Y, wherein Y is selected from the group consisting of an alkali metal and an alkaline earth metal. More specifically, this process for chemically modifying an aluminum oxide support for a rhodium catalyst suitable for use as an automotive catalyst in controlling automotive exhaust emissions includes replacing isolated hydroxyl groups on the aluminum oxide support with OY groups to resist or substantially prevent the oxidative conversion of supported metallic rhodium $Rh_x^{(O)}$ to $Rh^{(I)}$, and effecting the replacement by reacting the aluminum oxide support with an alumina modifier that includes an inorganic cation, Y, wherein Y is selected from the group consisting of an alkali metal and an alkaline earth metal. The alumina modifier may be salts of the alkali metals and the alkaline earth metals such as for example sodium carbonate, sodium bicarbonate, calcium carbonate and calcium bicarbonate.

In a preferred embodiment of this invention, the alumina modifier is potassium carbonate $(K_2CO_3)$. In this preferred embodiment, the exchange-functionalization of isolated Al—OH groups with potassium cations $(K^+)$ to produce Al—OK groups provides a method for the stabilization of $Rh/Al_2O_3$ catalysts against $Rh^{(I)}$ formation. In the preferred embodiment employing potassium carbonate, the resulting Rh/K—Al$_2$O$_3$ catalysts are stable against Rh$_x$$^{(O)}$ degradation in the presence of carbon monoxide gas. The stability of Rh/Al$_2$O$_3$ and Rh/K—Al$_2$O$_3$ catalysts toward conversion to oxidized Rh$^{(I)}$(CO)$_2$ species was determined using infrared spectroscopy.

Figure 2:
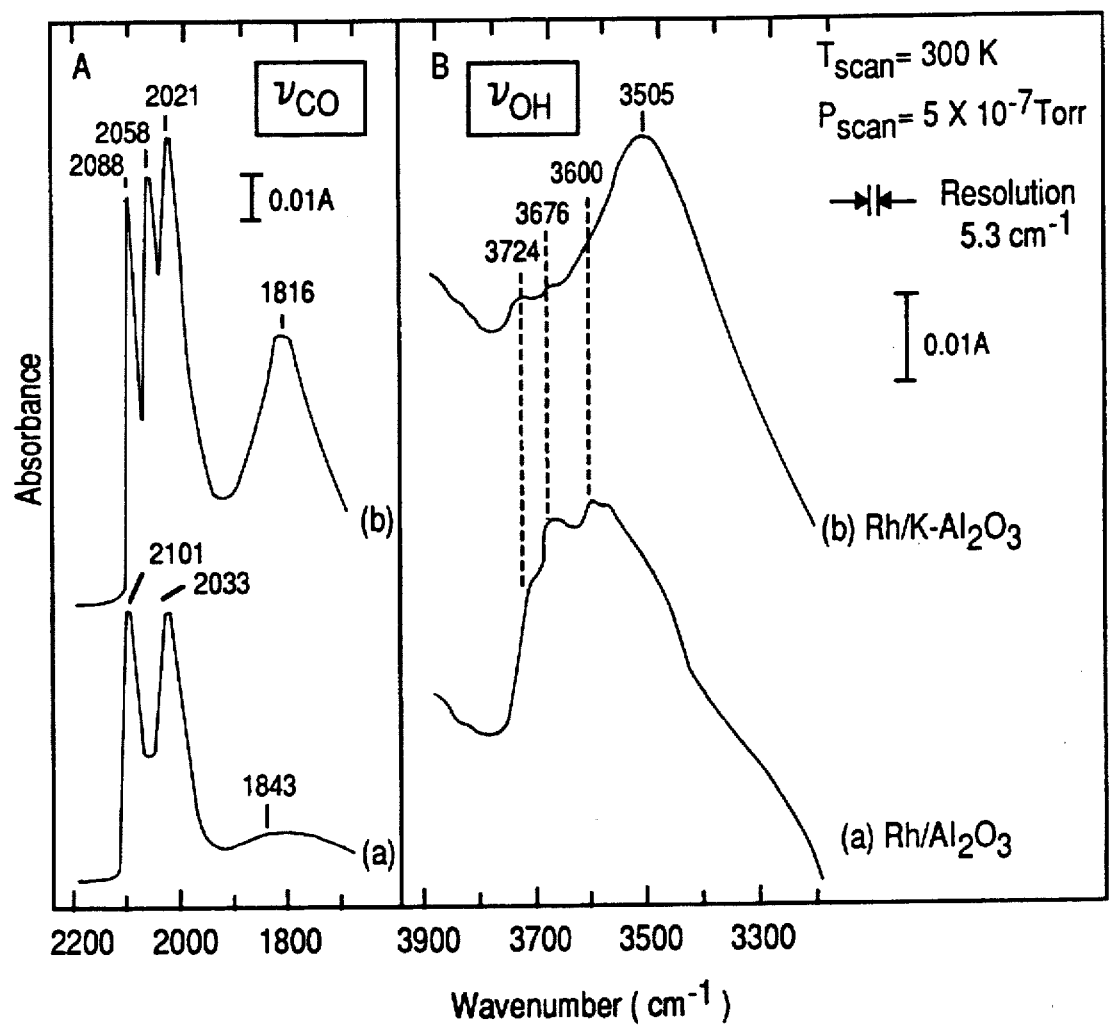
FIG. 2 shows an infrared spectroscopic comparison of chemisorbed CO species and Al—OH species on $Rh/Al_2O_3$ and $Rh/K$—$Al_2O_3$ catalysts.

In FIG. 2 a comparison of chemisorbed CO species and Al—OH species on Rh/Al$_2$O$_3$ and Rh/K—Al$_2$O$_3$ catalysts is set forth. It is seen in FIG. 2(B) that the hydroxyl groups in the region 3750 cm$^{-1}$ –3600 cm$^{-1}$ are strongly suppressed upon potassium functionalization. The OH species are observed to be lost as OK species are produced. The effect of this on the infrared spectrum of chemisorbed CO on rhodium is shown in FIG. 2(A).

In FIG. 2(A)(a), the spectrum for Rh/Al$_2$O$_3$ shows the strong doublet at 2101 cm$^{-1}$ and 2033 cm$^{-1}$ due to Rh$^{(I)}$(CO)$_2$ and a weak band at 1843 cm$^{-1}$ due to some population of bridged-CO species on Rh$_x$$^{(O)}$ sites. Strong absorption near 2058 cm$^{-1}$ is missing due to the absence of appreciable amounts of Rh$_x$$^{(O)}$ sites. By contrast, in FIG. 2(A)(b), the spectrum for Rh/K—Al$_2$O$_3$ shows strong absorption bands due to bridged-CO (1816 cm$^{-1}$) and terminal-CO (2058 cm$^{-1}$) on Rh$_x$$^{(O)}$ sites, along with Rh$^{(I)}$(CO)$_2$ species which exhibit a small shift of 12–13 cm$^{-1}$ to lower wavenumbers.

A comparison of the normalized hydroxyl spectrum for each catalyst prior to CO adsorption is shown in FIG. 2(B). In the spectrum for Rh/Al$_2$O$_3$ as set forth in FIG. 2(B)(a), the presence of isolated OH groups is indicated by OH bands at 3724 cm$^{-1}$ and 3676 cm$^{-1}$ prior to CO adsorption. These bands disappear upon the formation of Rh$^{(I)}$(CO)$_2$ species, as the isolated OH groups are consumed in the production of Rh$^{(I)}$(CO)$_2$ species.

FIG. 2(B)(b) shows that for the Rh/K—Al$_2$O$_3$ catalysts the isolated —OH species are strongly diminished in absorbance prior to CO treatment. Since Rh$^{(I)}$(CO)$_2$ formation requires isolated —OH species, less degradation of Rh$_x$$^{(O)}$ can occur in the presence of CO. Thus, it will be appreciated that Rh/K—Al$_2$O$_3$ catalysts exhibit a limited tendency to produce Rh$^{(I)}$(CO)$_2$ species in the presence of CO(g). Infrared spectroscopy indicates that Rh$_x$$^{(O)}$ sites, however, remain abundant. This is due to the replacement of isolated Al—OH groups by Al—OK groups, removing the Al—OH as an agent for 1/x Rh$_x$$^{(O)}$→Rh$^{(I)}$(CO)$_2$ formation.

Functionalization of Al—OH groups to produce Al—OK groups is effective in reducing the ability of CO chemisorption to produce a uniformly high dispersion of Rh$^{(I)}$. The conversion of Rh$_x$$^{(O)}$ to Rh$^{(I)}$ sites by CO treatment is substantially suppressed when Rh is supported on the K-functionalized Al$_2$O$_3$, as indicated by the enhanced absorbance of terminal-CO and bridged-CO species on Rh$_x$$^{(O)}$ sites, FIG. 2(A)(b). The functionalization of the aluminum oxide support with K$^+$ prior to Rh deposition does not produce Rh$_x$$^{(O)}$ sites modified by K$^+$. Normal CO infrared spectra characteristic of the pure Rh$_x$$^{(O)}$ surface are obtained using the process of this invention of K modification of the Al$_2$O$_3$.

Infrared spectra in the hydroxyl region obtained from untreated aluminum oxide and potassium carbonate impregnated aluminum oxide show that the net surface hydroxylation of aluminum oxide decreases considerably as a result of the carbonate impregnation. Thus, it will be appreciated that the isolated Al—OH groups are largely removed by a reaction during the impregnation procedure with potassium carbonate. X-ray diffraction patterns of K—Al$_2$O$_3$ indicate that the impregnation of aluminum oxide by K$^+$, followed by calcination at 973 Kelvin, does not form additional bulk phases at the level of detection of x-ray diffraction, thus suggesting that the Al—OK groups are produced on the aluminum oxide surface. The infrared spectrum results and the x-ray diffraction analysis results suggest that K$^+$ ions replace the protons of isolated hydroxyl groups on the alumina surface.

This invention provides for the chemical modification of an aluminum oxide supported rhodium catalyst which forms the basis for a catalyst for use in automotive catalytic converters to control automotive exhaust emissions for the protection of the environment. This automotive catalyst includes an aluminum oxide supported rhodium catalyst having non-oxidized rhodium sites. The modified aluminum oxide supported rhodium catalyst is characterized by surface hydroxyl groups having been converted to OY groups by reacting the aluminum oxide support with an alumina modifier. The alumina modifier includes an inorganic compound containing the cation Y, wherein Y is selected from the group consisting of an alkaline metal and an alkaline earth metal. The alumina modifier may be, for example, potassium carbonate.

As determined by spectroscopic measurement, the hereinbefore described chemical process and catalyst of this invention are characterized by the property of resisting or substantially preventing the conversion of rhodium metallic sites, Rh$_x$$^{(O)}$, to oxidized rhodium sites, Rh$^{(I)}$, under extreme environmental conditions such as may be found in automotive exhaust converters.

Figure 3:
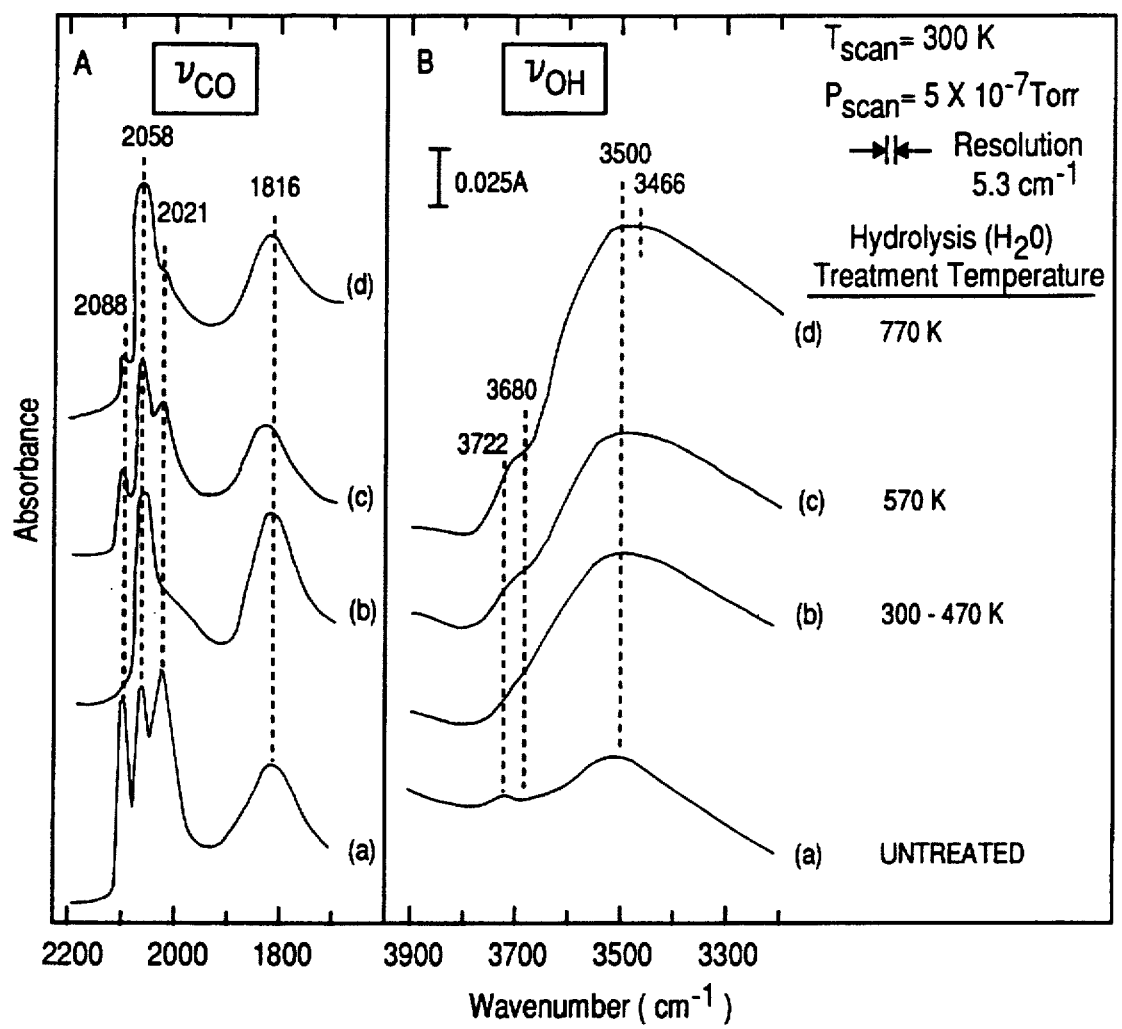
FIG. 3 shows the infrared spectra for $Rh/K$—$Al_2O_3$ catalysts for various hydrolysis treatments as a function of the treatment temperature.

The behavior of Rh/K—Al$_2$O$_3$ under the environmental stress of extreme hydrolysis conditions is shown in FIG. 3. The data presented in FIG. 3 were obtained by monitoring CO— and OH— infrared spectra following treatment of the CO-covered catalyst for 30 minutes with 2 Torr water vapor pressure in a temperature range of 300–770 Kelvin. In FIG. 3, the infrared spectra for the various hydrolysis treatments are shown as a function of the treatment temperature. FIG. 3 shows that the Rh$^{(I)}$(CO)$_2$ species are destroyed during the hydrolysis.

The carbon monoxide ($\nu_{CO}$) spectrum shown in FIG. 3(A)(a) shows that both Rh$_x$$^{(O)}$ and Rh$^{(I)}$ sites are present. Upon heating to 470 Kelvin under H$_2$O(g), FIG. 3(A)(b) shows that Rh$^{(I)}$(CO)$_2$ starts to disappear and both bridged-CO and terminal-CO species undergo enhancement of their absorbance. Continued H$_2$O(g) treatment to 570 Kelvin results in complete loss of CO absorbance. The spectra shown in FIGS. 3(A)(c) and 3(A)(d) are obtained by additional CO adsorption at 2 Torr following heating under H$_2$O(g) followed by evacuation at 300 Kelvin. In FIG. 3(A)(c), a partial recovery of Rh$^{(I)}$(CO)$_2$ absorbance is obtained at 570 Kelvin, but this trend is reversed again upon heating to 770 Kelvin as shown in FIG. 3(A)(d).

The hydroxyl spectra ($\nu_{OH}$) shown in FIG. 3(B) shows that hydrolysis causes a significant enhancement of the associated-OH absorbance, but only a small enhancement of the isolated-OH absorbances above 3680 cm$^{-1}$. These results demonstrate that the Rh/K—Al$_2$O$_3$ catalysts are stabilized against hydrolysis processes, and therefore do not produce large amounts of Rh$^{(I)}$(CO)$_2$, at temperatures up to 770 Kelvin in H$_2$O(g) at 2 Torr pressure.

It will be appreciated by those persons skilled in the art that this invention provides a process for the chemical modification of an aluminum oxide supported rhodium catalyst. The resultant catalyst may advantageously be used in automotive catalytic converters for environmental protection and in other catalytic processes requiring Rh$_x$$^{(O)}$ sites. It will be understood from the hereinbefore described invention that the conversion of Al—OH groups by an alumina modifier as hereinbefore described provides a process for the stabilization of Rh/Al$_2$O$_3$ catalysts against Rh$^{(f)}$ formation. Further, the chemical modification provided for in the present invention enhances the performance of an aluminum oxide supported rhodium catalyst such as may be employed in the automotive industry to control automotive exhaust emissions.

In order to further disclose a preferred practice of the invention, the following example is provided.

EXAMPLE I

For infrared spectroscopic observation, aluminum oxide supported rhodium catalysts and potassium-modified aluminum oxide supported rhodium catalysts were prepared. Degussa γ-aluminum oxide C (104 m$^2$/g) and J. T. Baker anhydrous K$_2$CO$_3$ (99.98% pure) were used to prepare the K$_2$CO$_3$-impregnated γ-Al$_2$O$_3$ (K$_2$CO$_3$/Al$_2$O$_3$). The amount of K$_2$CO$_3$ required to obtain 5%-K (by weight) was dissolved in a volume (3 ml/g Al$_2$O$_3$) of distilled water. Then, an amount of γ-Al$_2$O$_3$ was sprinkled slowly into the carbonate solution while being stirred, until a homogeneous paste was formed. The paste was subsequently dried at 383 Kelvin for 24 hours in an electric oven. The dried material, K$_2$CO$_3$/Al$_2$O$_3$, was calcined at 973 Kelvin for 5 hours to obtain the K-modified Al$_2$O$_3$ (K—Al$_2$O$_3$). K—Al$_2$O$_3$ was not analyzed for the actual potassium content. For comparison purposes, a sample of K-free γ-Al$_2$O$_3$ was prepared following the above procedure.

The catalyst preparation procedure involved slurrying the required amounts of RhCl$_3$·3H$_2$O (Aldrich) and K-modified or K-free alumina to produce 2.2% by weight Rh/K-Al$_2$O$_3$ or 2.2% Rh/Al$_2$O$_3$, respectively. The slurrying was effected in a liquid consisting of nine volumes of acetone and one volume of distilled water, by ultrasonic agitation for 45 minutes. The K-containing suspension required a longer period of ultrasonic agitation (approximately 1.5 hours) to yield a reasonable slurry. The slurry was then uniformly sprayed, by a nitrogen-pressurized atomizer, onto the entire exposed tungsten grid area (5.2 cm$^2$) of a stainless steel ultrahigh vacuum infrared cell equipped with CaF$_2$ optical windows allowing infrared measurements in the 4000–1000 cm$^{-1}$ spectral range. The cell was attached to a bakeable all-metal gas handling system equipped with a liquid nitrogen cooled zeolite sorption pump, a 30 L/s (liter/second) ion pump, a Baratron capacitance manometer and a quadrupole mass spectrometer for gas measurements. The base pressure in this system was typically 1×10$^{-8}$ Torr. The grid was electrically heated during spraying to 323–333 Kelvin to flash evaporate the liquid phase. The net weight of the material deposited onto the grid varied, depending on the final state of gelation in the slurry. It was highest (28.4 mg) with the K-free materials, and lowest (12 mg) with the K-containing materials. Spectroscopic measurements were in some cases normalized to an identical mass of the supported catalysts.

The supported Rh catalyst was then prepared by reducing the catalyst parent material, following 12 hours outgassing at 473 Kelvin. The reduction was achieved at 473 Kelvin with four successive exposures of 400 Torr of H$_2$ (99.9995% pure, Matheson Gas Products) for 15–60 minutes. After each exposure, the cell was evacuated for 30 minutes, followed by outgassing at the reduction temperature for 12 hours.

The carbon monoxide used with adsorption experiments was 99.9% pure and was obtained from Matheson Gas Products in a break-seal glass storage bulb. The water atmosphere used with the hydrolysis experiments was obtained by expanding the vapor of doubly-distilled water which was purified prior to application by freeze-pump-thaw cycles.

Transmission infrared spectra were measured for the catalyst and for the adsorbed species in a purged double beam infrared grating spectrometer (Perkin-Elmer Model 580B) coupled with a data station (Perkin-Elmer Model 3500) for data storage and manipulation. Spectra were signal averaged for data acquisition times of 2.2 sec/cm$^{-1}$ (3900–3200 cm$^{-1}$), 3.7 sec/cm$^{-1}$ (2400–1700 cm$^{-1}$), and 2.1 sec/cm$^{-1}$ (1700–1000 cm$^{-1}$), acquired at 1 point/cm$^{-1}$.

X-ray powered diffractograms were obtained using a diffractometer (Diano model XRD 700). A Diano model CA-8L generator that operated at 50 kV (kilovolts) and 32 mA (milliamps) provided a source of Ni-filtered CuK$_{\alpha 0}$ radiation [λ=1.54051 Å (angstrom)]. The diffractometer was operated with 3.0° diverging and 0.2° receiving slits at a scan rate of 2°/minute, and produced a continuous trace of diffracted x-ray intensity as a function of 2θ. The samples for diffraction studies were obtained by scraping the material off the tungsten grid and pressing the powder onto a glass substrate. Diffraction patterns I/I$_o$ (I=X-ray intensity at a particular peak; I$_o$=intensity of largest peak) vs. d-spacings (d=interplanar spacing of crystallographic planes in a material (Å)) were derived from the diffractograms and were matched subsequently with those filed as American Society For Testing and Materials standards.

The K-Al$_2$O$_3$ support material were prepared by calcination of K$_2$CO$_3$/Al$_2$O$_3$ at 973 Kelvin for 5 hours. To observe the thermochemical processes occurring during calcination, separate experiments were performed in which infrared spectra were taken from K$_2$CO$_3$/Al$_2$O$_3$ mounted inside the infrared cell, following 48 hours outgassing at 473 Kelvin and 5×10$^{-6}$ Torr. To mimic calcination, sequential heating experiments were carried out under vacuum at higher temperatures (up to 973 Kelvin) for 30 minutes followed by infrared measurements. The spectra were taken at 300 Kelvin in the $\nu_{OH}$ (4000–3000 cm$^{-1}$), $\nu_{CO_3}2^-$ (1800–1300 cm$^{-1}$) and $\delta_{CO_3}2^-$ (1200–1000 cm$^{-1}$) spectral ranges.

The spectra obtained for K$_2$CO$_3$/Al$_2$O$_3$ after outgassing at 473 Kelvin were similar to those of the unheated material (at 300 Kelvin), and differed significantly in the $\nu_{OH}$ region from that of untreated Al$_2$O$_3$. For K$_2$CO$_3$/Al$_2$O$_3$, the $\nu_{OH}$ spectra displayed bands at 3718, approximately 3350 and 3445 cm$^{-1}$. The 3718- and approximately 3550-cm$^{-1}$ bands were due to small amounts of isolated and to associated Al—OH groups, respectively. For the carbonate species, the spectra monitored several $\nu_{CO_3}2^-$ bands at 1560, 1395 and 1348 cm$^{-1}$. In addition, a very weak $\delta_{CO_3}2^-$ band was observed at 1097 cm$^{-1}$. These bands indicated coexisting monodentate (1395 cm$^{-1}$ ($\nu_{as}$), 1348 cm$^{-1}$ ($\nu_s$) and 1097 cm$^{-1}$ (δ); ($\nu_{as-\nu_s}$)=47 cm$^{-1}$) and chelating bidentate (1560 cm$^{-1}$ ($\nu_{as}$) and 1348 cm$^{-1}$ ($\nu_s$); ($\nu_{as}-\nu_s$)=212 cm$^{-1}$) CO$_3{}^{2-}$ species bound to K$^+$ ions. These results show that carbonate ions are bound in two ways to the surface, through one "O" and through 2 "O" ligands. The resemblance of the infrared spectra obtained here to the spectra of potassium hydroaluminocarbonate indicated that there was a strong interaction between K$_2$CO$_3$ and the alumina surface. In addition, the strong $\nu_{OH}$ band at 3445 cm$^{-1}$ that was not typical of alumina surface-OH bands, was due to Al—OH groups associated with potassium.

Following heating at 570 Kelvin, the infrared spectra exhibited an appreciable weakening of the monodentate $\nu_{CO_3}2^-$ bands, and the band due to the bending mode at 1097

$cm^{-1}$ disappeared. Concomitantly, the $v_{OH}$ band at 3445 $cm^{-1}$ decreased significantly in absorbance. A mass spectrometric analysis of the gas phase during the thermal treatment at 570 Kelvin detected the production of $CO_2$ and $H_2O$. These results indicated that the surface carbonate began to decompose at 570 Kelvin. The persistence of the $v_{CO_3}2^-$ infrared bands at 1560 and 2348 $cm^{-1}$ suggested that the remaining carbonate species were preferably bidentate bound to potassium.

Increasing the temperature to 770 Kelvin resulted in infrared spectra that displayed very weak bands due to Al—OH groups (at 3718 and approximately 3500 $cm^{-1}$) and bidentate $CO_3^{2-}$ species (at 1560 and 1348 $cm^{-1}$). When heated to 870 Kelvin, both the OH and the $CO_3^{2-}$ bands disappeared This indicated that $K_2CO_3/Al_2O_3$ decomposed extensively in the temperature range of about 570–870 Kelvin. This suggested that a strong interaction occurred between $K_2CO_3$ and $\gamma$-$Al_2O_3$, resulting in a lower $CO_3^{2-}$ decomposition temperature.

The thermal stability of the Al—OH groups in the presence of $K_2CO_3$ was also diminished considerably. At 870 Kelvin, almost all of the Al—OH species disappeared. By contrast, on $Al_2O_3$ untreated with $K_2CO_3$, the Al—OH species persisted up to about 1100 Kelvin. This confirmed that the reactions leading to $K_2CO_3$ decomposition on $Al_2O_3$ involved Al—OH groups.

The hereinbefore mentioned results confirm that an alumina modifier, such as for example $K_2CO_3$, converts isolated Al—OH groups to Al—OK groups on $\gamma$-$Al_2O_3$ catalyst support material. The Rh/K-$Al_2O_3$ catalysts exhibit a limited tendency to produce $Rh^{(I)}(CO)_2$ species in the presence of carbon monoxide gas due to the replacement of isolated Al—OH groups by Al—OK groups. This replacement of isolated Al—OH groups by Al—OK groups removes the Al—OH groups as agents for the formation of $Rh^{(I)}(CO)_2$. Further, Rh/K—$Al_2O_3$ catalysts are stable against hydrolysis to produce $Rh^{(I)}(CO)_2$ at temperatures up to 770 Kelvin in $H_2O(g)$ at 2 Torr pressure.

It will be appreciated by those skilled in the art that this invention provides a process for the chemical modification of an aluminum oxide supported rhodium catalyst that forms the basis for an automotive catalytic converter useful in environmental protection. It will be understood that the chemical modification of this invention involves the use of an alumina modifier to replace surface hydroxyl groups from the aluminum oxide support with OY groups so that the conversion of active rhodium to oxidized rhodium species by reduction of the active hydroxyl groups cannot substantially occur, and wherein the alumina modifier includes an inorganic compound containing the cation Y, wherein Y is either an alkali metal or an alkaline earth metal.

Whereas particular embodiments of this invention have been described herein for purposes of illustration, it will be evident to those skilled in the art that numerous variations of the details of the present invention may be made without departing from the invention as defined in the appended claims.

What is claimed is:

1. A process for chemically modifying a catalyst suitable for use as an automotive catalyst in controlling automotive exhaust emissions comprising:

providing an aluminum oxide support with hydroxyl groups;

converting substantially all said hydroxyl groups on said aluminum oxide support into OY groups followed by calcination at about 973K;

effecting said conversion by reacting said aluminum oxide support with an alumina modifier which contains an inorganic compound having sufficient cation Y to convert substantially all said hydroxyl groups on said aluminum oxide support into OY groups, wherein Y is selected from the group consisting of an alkali metal and an alkaline earth metal; and adding rhodium as said catalyst onto said support, with said support substantially retaining said rhodium catalyst in an active state so that a substantial number of nonoxidized rhodium sites are retained on said support, thereby resisting both the reestablishment of Al—OH during hydrolysis processes and the subsequent formation of oxidized rhodium sims due to the presence of Al—OH surface species.

2. The process of claim 1, including securing said rhodium catalyst to said aluminum oxide support prior to said conversion.

3. The process of claim 1, wherein said alkali metal is potassium.

4. The process of claim 1, wherein said inorganic compound is carbonate containing the cation Y.

5. The process of claim 1, wherein said alumina modifier is potassium carbonate.

6. A catalyst suitable for use as an automotive catalyst in controlling automotive exhaust emissions, such as carbon monoxide, comprising:

an aluminum oxide supported rhodium catalyst having a substantial number of nonoxidized sites; and said aluminum oxide supported rhodium catalyst characterized by substantially all surface hydroxyl groups having been converted to OY groups prior to the addition of said rhodium catalyst to said support by reacting said aluminum oxide support with an alumina modifier which comprises an inorganic compound having sufficient cation Y to convert substantially all said hydroxyl groups on said aluminum oxide support into OY groups followed by calcination at about 973K, wherein Y is selected from the group consisting of an alkali metal and an alkaline earth metal, whereby after the addition of said rhodium catalyst to said support said rhodium catalyst is substantially retained in an active, nonoxidized state with little or no oxidized rhodium sites to react with the components of said automotive catalyst and the reestablishment of Al—OH groups is resisted.

7. The catalyst of claim 6, wherein said alkali metal is potassium.

8. The catalyst of claim 6, wherein said inorganic compound is carbonate containing the cation Y.

9. The catalyst of claim 6, wherein said alumina modifier is potassium carbonate.

10. The process of claim 1, employing said process in automotive catalytic converters to preserve said nonoxidized rhodium sites.

11. The catalyst of claim 6, wherein said catalyst is characterized by the property of resisting CO chemisorption to produce a high dispersion of oxidized rhodium sites.

12. The catalyst of claim 6, wherein Al—OK groups are present on the aluminum oxide surface.

13. A process of claim 1, including adding said rhodium catalyst to said aluminum oxide support after said conversion of said hydroxyl groups to said OY groups.

14. The catalyst of claim 6, wherein said catalyst is characterized by resistance against nonoxidized rhodium site degradation in the presence of CO gas.

\* \* \* \* \*

UNITED STATES PATENT AND TRADEMARK OFFICE
CERTIFICATE OF CORRECTION

PATENT NO. : 5,492,880
DATED : February 20, 1996
INVENTOR(S) : MOHAMED I. ZAKI, TODD H. BALLINGER and JOHN T. YATES, JR.

It is certified that error appears in the above-indentified patent and that said Letters Patent is hereby corrected as shown below:

In Claim 1, column 10, line 12, "sims" should be --sites--.

Signed and Sealed this

Tenth Day of December, 1996

Attest:

BRUCE LEHMAN

*Attesting Officer*     *Commissioner of Patents and Trademarks*